July 12, 1927. A. F. WALTERS Re. 16,671

LOCK HINGE FOR DOORS AND OTHER MOVABLE ELEMENTS

Original Filed Jan. 25, 1923

WITNESS
H. N. Hurst

INVENTOR
A. F. Walters
BY Denison & Thompson
ATTORNEYS

Reissued July 12, 1927. Re. 16,671

UNITED STATES PATENT OFFICE.

ALBERT F. WALTERS, OF SYRACUSE, NEW YORK.

LOCK HINGE FOR DOORS AND OTHER MOVABLE ELEMENTS.

Original No. 1,480,647, dated January 15, 1924, Serial No. 614,774, filed January 25, 1923. Application for reissue filed April 29, 1925. Serial No. 28,246.

This invention relates to a lock hinge for doors and other swinging elements and refers more particularly to the means for automatically locking the door in its open position in combination with additional means operable at will for releasing the locking means.

The main object is to make the hinge and the locking device as a unitary article of manufacture by incorporating the locking device directly upon the hinge sections.

The hinge section which is secured to the door is usually of the "strap" type or relatively long and narrow and one of the specific objects of this invention is to provide a catch or latch bar hinged at one end to the relatively fixed hinge section or to the door frame and having its other end extended across the hinge joint lengthwise of the movable hinge section in sliding engagement therewith and adapted to automatically interlock by its own weight with a cooperative shoulder or keeper on said movable section when the door is opened.

A further object is to provide means on the door operable at will for tripping the latch from its holding position to enable the door to be closed.

Other objects and uses will be brought out in the following description.

Figure 1:
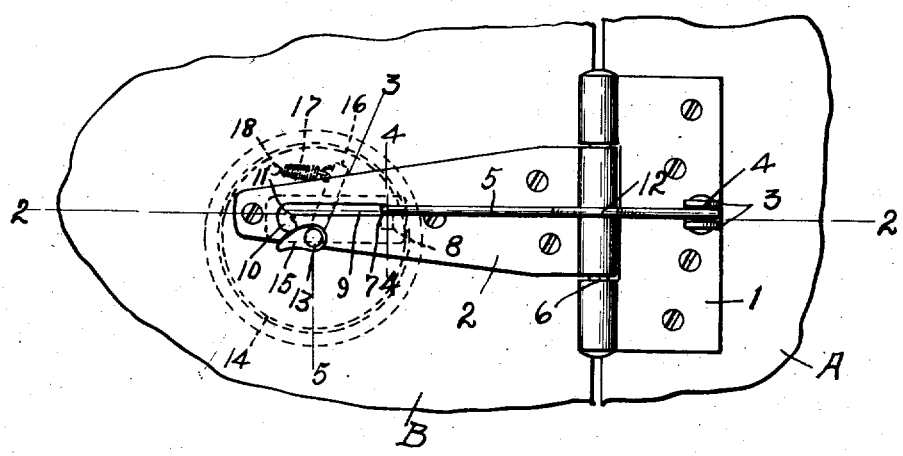
Figure 1 is an inner face view of portions of a door and its supporting frame showing my improved lock hinge in operative position thereon, the door being shown as closed.
Figure 2:
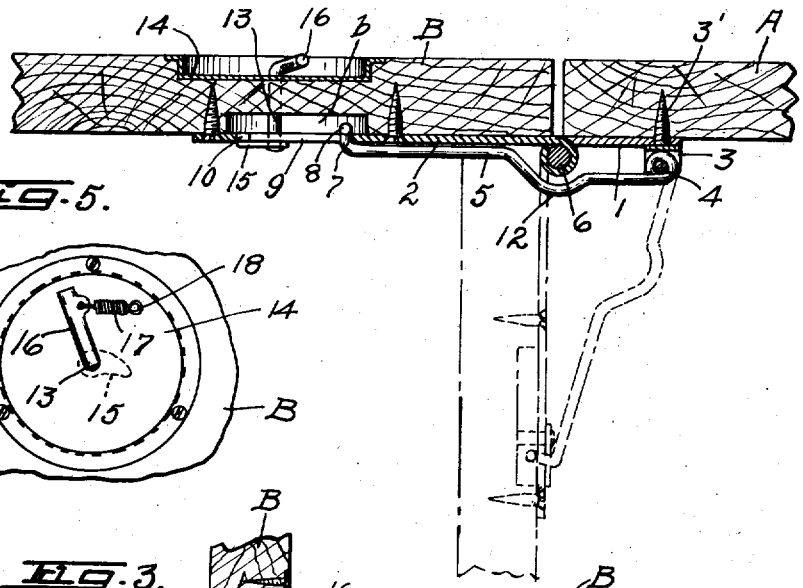
Figure 2 is a horizontal sectional view taken on line 2—2, Figure 1, the dotted lines indicating the open position of the door and the locked position of the catch.
Figure 3:
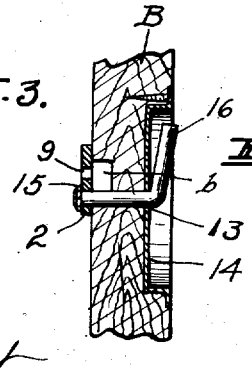
Figure 4:
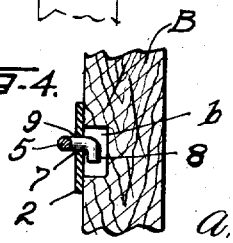

Figures 3 and 4 are detail vertical sectional views taken respectively on lines 3—3 and 4—4, Figure 1.

Figure 5:
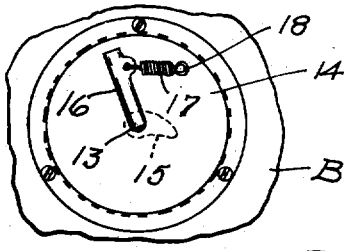

Figure 5 is an inner face view of the latch releasing device and its inner supporting plate together with a retracting spring for holding said device in its inoperative position.

The hinge comprises a relatively fixed section —1— adapted to be secured to the frame as —A— of the door and a movable section —2— adapted to be secured to the door —B—, the section —1— being provided with pivotal bearings —3— for receiving a pivotal pin —4— to which is pivoted one end of a latch bar —5— to swing horizontally and vertically.

This latch bar extends across and some distance beyond the hinge joint —6— lengthwise of the hinge section —2— and has its other end offset at —7— in a plane at right angles to the axis of the hinge joint and terminates in a downwardly projecting shoulder —8— parallel with said axis.

The lateral offset portion —7— is slidable in a lengthwise slot —9— in the hinge section —2—, said slot being of sufficient length to allow the door to swing from its closed position to its extreme open position or in this instance, through an arc of substantially 90 degrees and its outer end is provided with a downwardly extending branch —10— into which the offset —7— is adapted to drop by its own weight when the door is fully opened.

This branch slot —10— forms a shoulder or keeper —11— cooperating with the offset —7— to hold the door in its open position although the opposite wall of the branch slot also cooperates with the offset —7— to hold the door against further opening so that the two walls of the branch slot serve to prevent the vibration of the door when fully opened.

In order that the latch bar —5— may lie as closely as possible to the hinge sections —1— and —2— when the door is closed, the intermediate portion thereof is arched upwardly at —12— to receive the raised portions of the hinge joint —6—.

As illustrated, the lugs or bearings —3— constitute the head of a screw —3′— which is passed through an opening in the hinge section —1— and is screwed into the door frame thereby additionally supporting said hinge section and at the same time forming a secure fastening for the latch support.

The portion of the door —B— adjacent the slots —9— and —10— are routed or chambered at —b— to permit the free sliding movement of the adjacent end of the latch bar —5— therein.

The means for tripping the latch bar from holding engagement with the keeper —11— of the hinge section —2— comprises a rock shaft —13— extending transversely through an opening in the door and also through registering openings in a bearing plate —14— and in the hinge section —2— a short distance from the branch slot —10— toward the hinge joint and just below the slot —9— and has its inner end provided with a cam member —15— movable from the underside across the branch slot —10— for engaging the underside of offset —7— of the latch and thereby releasing the latch from its locking position when the shaft —13— is rocked in one direction.

The outer end of the rock shaft is provided with a hand piece —16— movable around the face of the plate —14— and is connected by a retracting spring —17— to a suitable post —18— on said bearing plate for returning the cam —15— to its inoperative position.

*Operation.*

When the door is opened from its closed position, the offset end —7— of the latch bar —5— slides along the slot —9— and when the door is fully opened, drops into the branch slot —10— where it is automatically locked against movement in the opposite direction by the shoulder —11— to hold the door in its open position.

By rocking the hand piece of the rock shaft —13— against the action of its retracting spring —17— causes the cam —15— to engage the underside of the offset —7— of the latch bar —5— and thereby to lift it out of engagement with the keeper —11— and thus permit the door to be closed either by hand or by any well-known automatic closing device not necessary to herein illustrate or describe.

What I claim is:

1. A locking hinge comprising a relatively fixed hinge section and a movable hinge section, in combination with a latch bar hinged at one end to the fixed section to swing vertically and horizontally and having its other end extended across and some distance beyond the hinge joint and provided with an offset slidable in a slot in the movable hinge section as the door is opened and closed, said slot having a downwardly extending branch into which the offset of the latch bar is adapted to drop when the door is opened to lock the door in said open position, and a rock shaft journaled on the movable hinge section and having one end provided with a cam for engaging said offset and tripping the latch from its locking position when the rock shaft is rotated in one direction, and a hand piece on the other end of the rock shaft for operating the same.

2. A locking hinge comprising a relatively fixed hinge section and a movable hinge section, in combination with a latch bar hinged at one end to the fixed section to swing vertically and horizontally and having its other end extended across and some distance beyond the hinge joint and provided with an offset slidable in a slot in the movable hinge section as the door is opened and closed, said slot having a downwardly extending branch into which the offset of the latch bar is adapted to drop when the door is opened to lock the door in said open position, a rock shaft journaled on the movable hinge section and having one end provided with a cam for engaging said offset and tripping the latch from its locking position when the rock shaft is rotated in one direction, a hand piece on the other end of the rock shaft for operating the same, and a spring for retracting the rock shaft to release the cam from engagement with the offset of the latch bar.

3. A locking hinge for swinging doors comprising a relatively fixed section and a movable section having a lengthwise slot, in combination with a latch bar hinged at one end to the fixed section to swing vertically and horizontally and having its other end slidable in said slot as the door is opened and closed, said slot having a downwardly extending branch into which the latch bar is adapted to drop when the door is opened to lock the door in said open position, and a rock shaft journaled on the movable section and provided with means for engaging and tripping the latch from its locking position when the rock shaft is rotated in one direction.

In witness whereof I have hereunto set my hand this 14th day of April, 1925.

ALBERT F. WALTERS.